Oct. 19, 1954  R. DAVISON ET AL  2,691,851
APPARATUS FOR DETECTING BOWING IN ROTATING CYLINDERS
OR ROLLS AND FOR STRAIGHTENING ROTATING CYLINDERS
OR ROLLS BY CONTROLLING THE BOWING WHEN DETECTED
Filed Sept. 1, 1951  4 Sheets-Sheet 1

Inventors
Richard Davison
Hubert Cecil Wynne
By
Morrison, Kennedy & Campbell
Attorneys

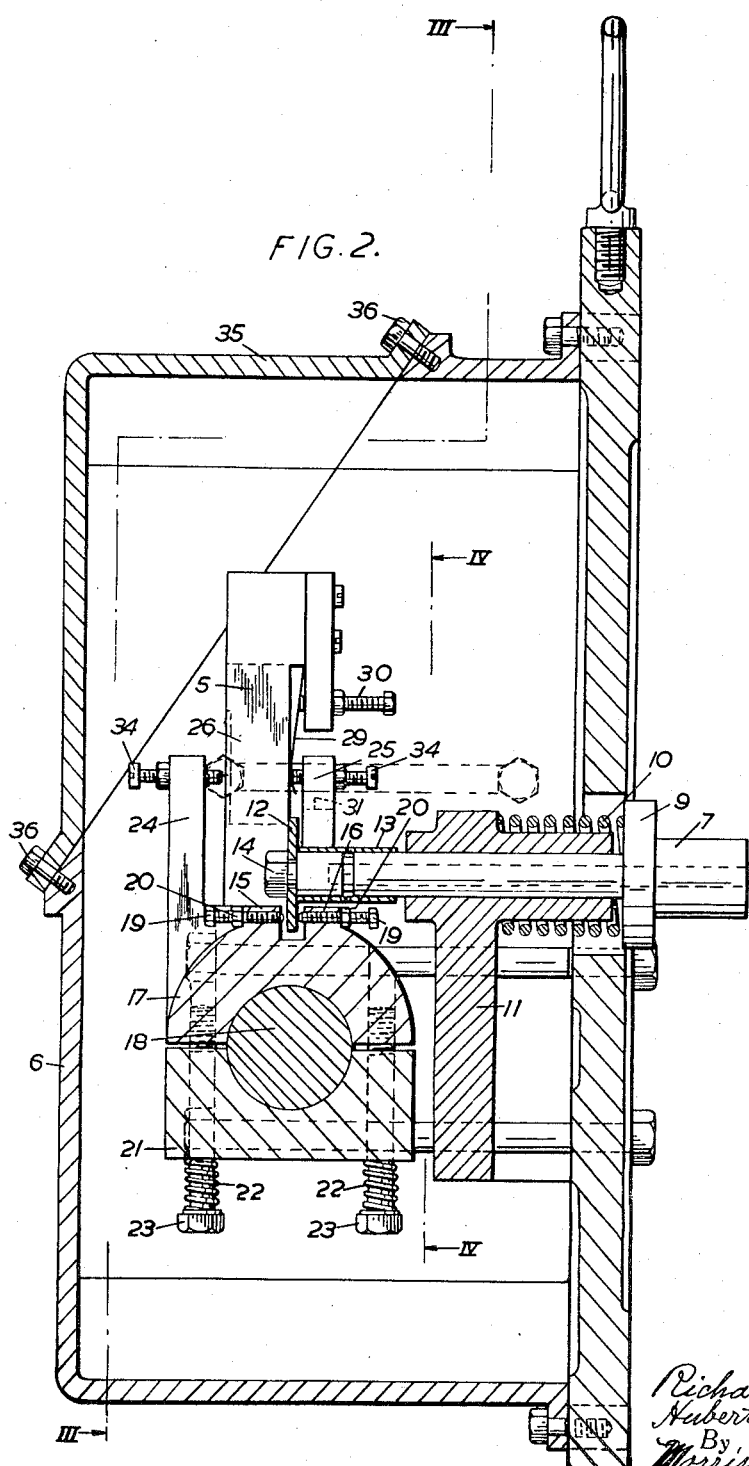

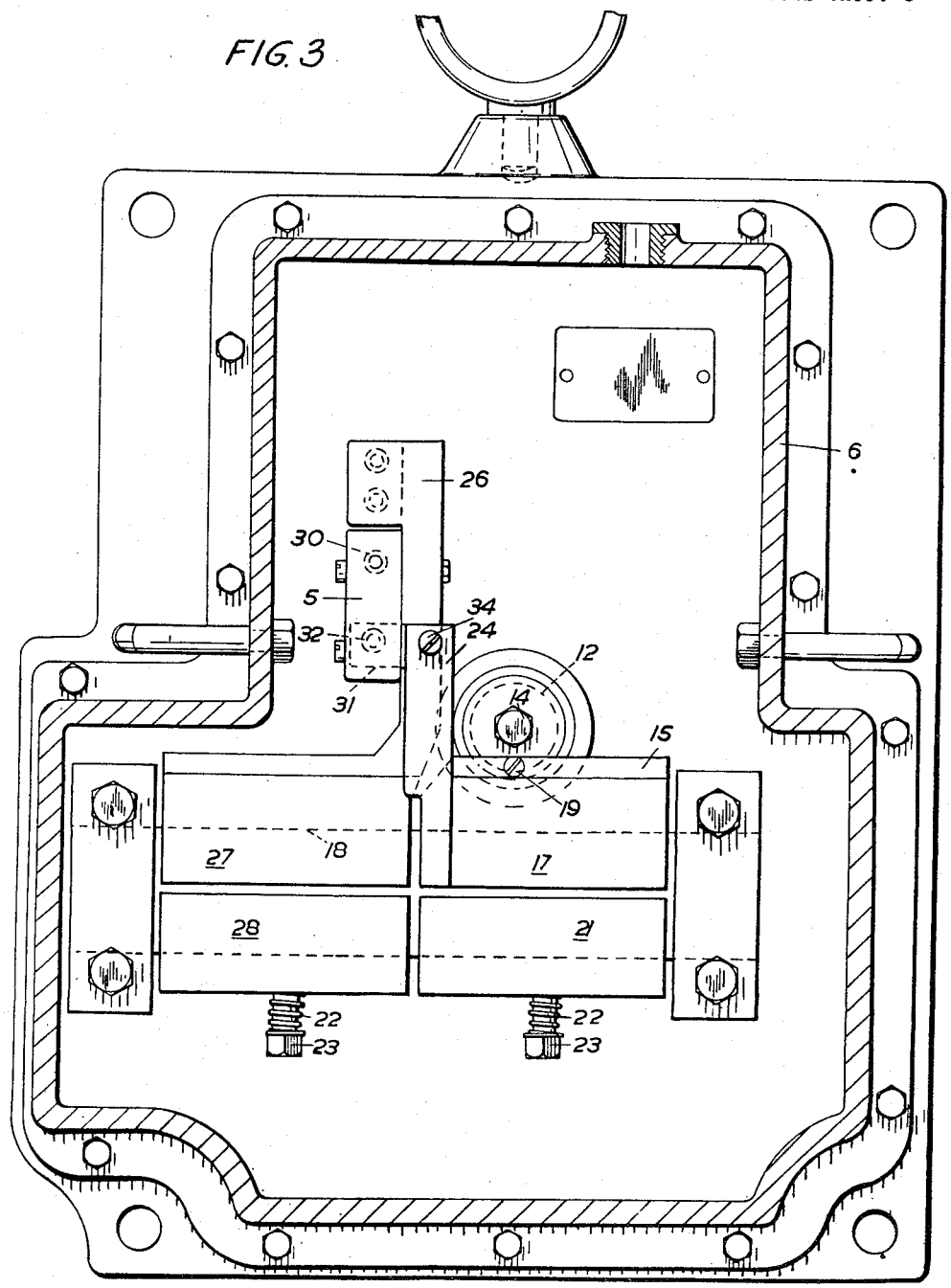

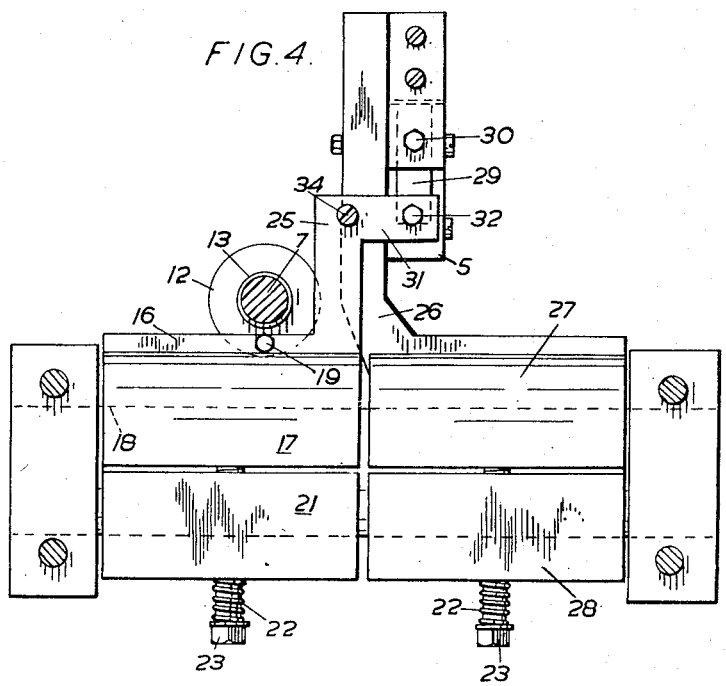

Patented Oct. 19, 1954

2,691,851

UNITED STATES PATENT OFFICE 2,691,851

APPARATUS FOR DETECTING BOWING IN ROTATING CYLINDERS OR ROLLS AND FOR STRAIGHTENING ROTATING CYLINDERS OR ROLLS BY CONTROLLING THE BOWING WHEN DETECTED

Richard Davison, St. Helens, and Hubert Cecil Wynne, Barnby Dun, England, assignors to Pilkington Brothers Limited, Liverpool, Lancaster County, England, a corporation of Great Britain Application September 1, 1951, Serial No. 244,835

Claims priority, application Great Britain August 11, 1951

5 Claims. (Cl. 49—14)

This invention relates to method of and apparatus for controlling bowing in rotating cylinders or rolls.

The invention is particularly advantageous for use in straightening the internally water-cooled casting cylinders or rolls used in continuous plate glass processes. Such cylinders or rolls which are slow moving members rotating at a speed of the order of one to ten revolutions per minute sometimes have a tendency to bend axially when in use owing to a number of causes or combinations of causes, some of which are hereinafter mentioned. When bowing of the cylinders or rolls occurs it results in the production of a regular variation in the thickness of the glass ribbon being produced and this, as will be understood, is a undesirable feature.

A cylinder or roll may bow as a result of any of the following causes or of combinations of such causes: local differences in the surface emissivity of the cylinder or roll, local differences in the co-efficient of heat transfer from the molten glass to the cylinder or roll, variations in the cylinder or roll wall thickness, local variations in the coefficient of heat transfer from the cylinder or roll bore to the cooling water, local variations in the conductivity of the cylinder or roll material, local variations in the specific heat of the cylinder or roll material, local variations of the specific gravity of the cylinder or roll material, local variations in the flow of the internal cooling water, or distortion due to ageing of the cylinder or roll material. In co-pending patent application for United States Letters Patent of Richard Davison and William Arthur Lightfoot, Serial No. 244,832, filed September 1, 1951, there is described for detecting bowing in rotating cylinders and for straightening cylinders by controlling the bowing when detected, apparatus comprising a sensing device responsive to bowing in the cylinder and active over that portion of the length of a cylinder wherein maximum bowing occurs, delivery means for delivering a stream of heat transferring medium on to the sensed bowed portion of the cylinder when it is in the trajectory of the stream, a valve controlling the supply of heat transferring medium to the delivery means and actuating means for the valve operable under control of said sensing device to effect delivery of the stream only during passage of the sensed bowed portion through the trajectory of the stream.

It is a main object of the present invention to provide apparatus which will operate an electric switch for controlling said delivery means, the arrangement being such that the switch will be operated by reason of the bowing of the cylinder or roll but not by oscillatory movement of frequencies much above that due to bowing of the cylinder or roll.

According to the present invention there is provided apparatus for controlling delivery of a heat transferring medium comprising delivery means to deliver a heat transferring medium, a support movable against frictional resistance, an electric switch movable with said support to control said delivery means, a switch actuator mounted for oscillation against frictional resistance, a sensing device to sense oscillatory movements of a cylinder, an adjustable lost-motion device operable by said sensing device to effect operation of the switch actuator and to suppress sensed oscillatory movements of frequencies much above that due to bowing of a cylinder and of substantially constant amplitude, the operating load for said switch being of such magnitude in relation to the resistance to movement of said support that the switch is operated by oscillatory movement of said switch actuator due to sensed bowing of a cylinder but is not operated by superimposed oscillatory movements of the actuator at lower frequencies.

In order that the invention may be more clearly understood, a preferred embodiment thereof will now be described, by way of example, with reference to the accompanying diagrammatic drawings, in which:

Fig. 2 is a side sectional elevation of the switch operating mechanism, and Fig. 3 is a section on the line III—III of Fig. 2.

Fig. 4 is an elevation taken on the line IV—IV of Fig. 2.

In the drawings like references designate similar parts.

Figure 1:
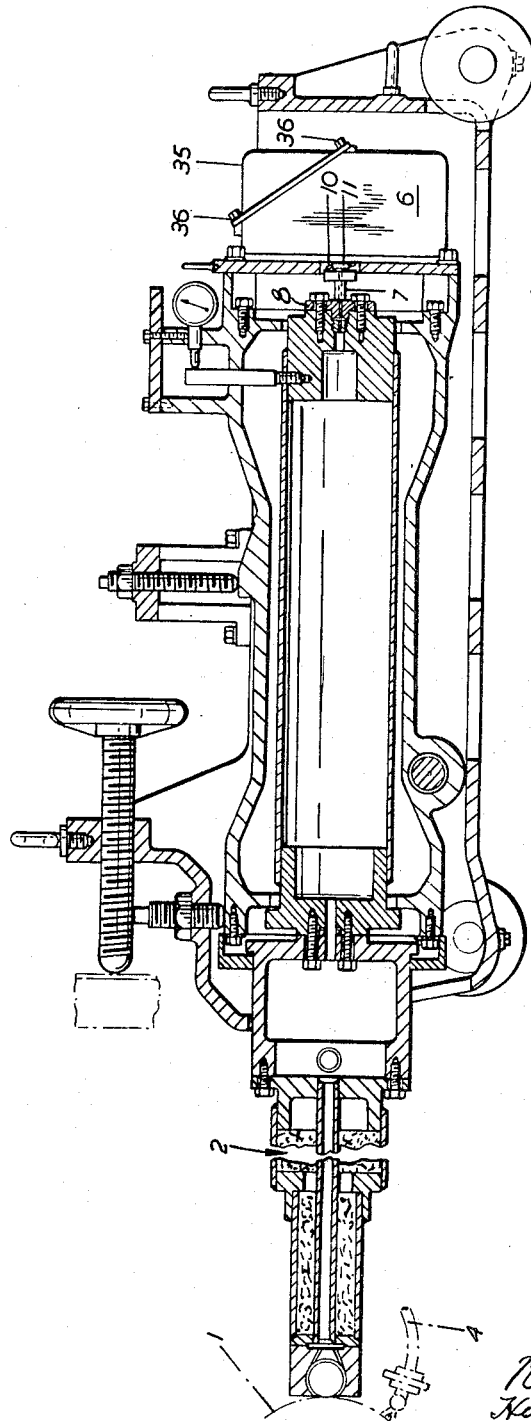
Fig. 1 is a side sectional elevation of a sensing device as described in the aforesaid co-pending application and illustrates the positional relation therewith of switch operating mechanism according to the present invention.

Referring to the drawings 1 indicates an internally water-cooled casting roll as normally used in the continuous plate glass process. As is well known the roll rotates at the rate of about one to ten revolutions per minute which results in the roll having a very slow linear speed.

At the position where maximum bowing of the roll occurs there is provided, to co-operate with that part of the circumference of the roll, a sensing device 2 the construction and operation of which forms no part of the present invention but is fully described in the aforesaid co-pending specification. As is described in the said co-pending specification bowing of the roll 1 is controlled, under the influence of the sensing device 2, by a stream 3 of heat transferring medium delivered by delivery means indicated generically in Fig. 1 as a pipe 4 controlled by a valve, not shown.

An electric micro-switch 5, Figs. 2 and 3, that is a switch operable by a very small motion, and the operating mechanism therefor are contained in a housing 6 from which extends one end of an axially slidable input member 7 which is maintained in abutting relation with a member 8 movable with the sensing device 2. As is described in the aforesaid co-pending specification, the valve which controls the flow through pipe 4 is an electro-pneumatic valve and is operable by the switch 5 through a time-delay mechanism.

As can be seen from Fig. 2, the input member 7 is provided with a flange 9 forming an abutment for one end of a spring 10 of which the other end abuts against a bearing member 11 in which member 7 is axially slidable. The member 7 is thus urged by spring 10 into abutting relation with the member 8 and the sensing device 2 is also urged thereby against the surface of the casting roll 1.

The inner end of the input member 7 carries a projection which, in the construction illustrated, is formed by a flange 12 on a thimble 13 secured on the end of the input member 7 by stud 14. The flange 12 is disposed between two lugs 15, 16 on the outer face of one half 17 of a split bearing carried on a fixed shaft 18. Adjustable contact screws 19 provided with locking nuts 20 are screwed into the lugs 15, 16 for engagement by the flange 12.

The other half 21 of the split bearing is spring-urged against the first half 17, so as to clamp the fixed shaft within the split bearing, by means of a coil spring 22, Figs. 3 and 4, adjustably loaded by means of screws 23 passing through the spring and through clearance holes in half-bearing 21 and threaded into the other half-bearing 17.

The half-bearing 17 carries a switch actuator formed by two arms 24, 25, Fig. 2, straddling the electric microswitch 5 which is secured by bolts to an arm 26 carried by a second split bearing 27, 28 (Fig. 3), similar to the first and mounted on the fixed shaft 18. The micro-switch is provided with a preloading spring 29, Figs. 2 and 4, adjustable by a screw 30 to adjust the operating load of the switch.

The arm 25 is formed with an extension 31, Figs. 3 and 4, provided with a screw 32 disposed to engage the operating element 29 of the micro-switch. The screw 32 is provided with a locking nut, not shown. Each arm 24, 25 is further provided with a screw 34 disposed to engage the arm 26 so that the operational clearance between the operating element 29 of the switch and the co-operating actuating screw 32 can be adjusted. The housing 6 is provided with a removable cover 35 secured by bolts 36 to give access to the interior of the housing.

Any desired magnification of the motion of the input member 7 can be obtained by suitable choice of the length of the oscillatable arms 24, 25.

To adjust the apparatus for use, the split bearings are tightened by means of the spring loading adjusting screws 23 to a value at which the bearings cannot be rotated about the fixed shaft 18 by a force sufficient to operate the micro-switch 5. In one particular case, for example, it has been found suitable to tighten both split bearings so as to withstand a torque of 24 ounce-inches but to rotate under a torque of 72 ounce-inches.

The lost-motion adjusting screws 19 are adjusted to give a lost-motion sufficient to accommodate the amplitude of the high frequency oscillations of the input member 7. For example in the case previously referred to, a clearance of 0.002 in. was found to be sufficient.

The contact screws 34 are also adjusted to a suitable working clearance relative to the switch carrying arm 26, for example 0.002 in. and the switch engaging screw 32 is adjusted so that the switch is closed when the switch carrying arm 26 is held against the appropriate contact screw 34. The apparatus is then in a condition such that the switch is closed when the switch actuator 17, 24, 25 is rocked in one direction, and is allowed to open on the return movement of the actuator.

The manner of operation of the switch actuating mechanism is as follows:

The high frequency oscillations of substantially constant amplitude which are transmitted by the sensing device 2 to the input member 7 are absorbed by the lost-motion device 12, 19, 19 and are not transmitted by the switch actuator 24, 25. The latter moves only in accordance with the oscillations of lower frequency due to the bowing of the rotating roll 1 and in accordance with the slow alterations in the position of the bearings of the roll, such oscillations of lower frequency being superimposed frequencies which modulate the high-frequency carrier wave as a whole and impart to the device a motion which is purely this modulation and which cause the micro-switch 5 to be operated each time the switch actuator reverses its direction of movement. The spring-loaded split bearings 17, 21, 27, 28 resist the small pressure needed to close the micro-switch and they also take up any wear so that uncontrolled back-lash does not appear during operation over extended periods of time. They also permit the arms 24, 25 to be oscillated by still lower frequency oscillations of the input member 7, without operating the micro-switch. Such still lower frequency oscillations, which are in effect slow shifts of datum, are thereby prevented from operating the micro-switch.

What we claim is:

1. Apparatus for controlling delivery means for a heat transferring medium, comprising delivery means to deliver a heat transferring medium, a support movable against frictional resistance, an electric switch movable with said support to control said delivery means, a switch actuator mounted for oscillation against frictional resistance, a sensing device operable to sense oscillatory movements of a cylinder, an adjustable lost-motion device operable by said sensing device to effect operation of the switch actuator and to suppress sensed oscillatory movements of frequencies much above that due to bowing of a cylinder and of substantially constant amplitude, the operating load for said switch being of such magnitude in relation to the resistance to movement of said support that the switch is operated by oscillatory movement of said switch actuator due to sensed bowing of a cylinder but is not operated by superimposed oscillatory movements of the actuator at lower frequencies.

2. Apparatus for controlling delivery means for a heat transferring medium, comprising delivery means to deliver a heat transferring medium, a shaft restrained against angular and axial movement, a support rockable about said shaft against frictional restraint, an electric switch movable with said support to control said delivery means, a switch actuator rockable about said shaft against frictional resistance, a sensing device operable to sense oscillatory movement of a cylinder, an adjustable lost-motion device operable by said sensing device to effect operation of theh switch actuator and to suppress sensed oscillatory movements of frequencies much above that due to bowing of a cylinder and of substantially constant amplitude, the operating load for said switch being of such magnitude in relation to the resistance to movement of said support that the switch is operated by oscillatory movement of said switch actuator due to sensed bowing of a cylinder but is not operated by superimposed oscillatory movements of the actuator at lower frequencies.

3. Apparatus for controlling delivery means for a heat transferring medium, comprising delivery means to deliver a heat transferring medium, a shaft restrained against angular and axial movement, a support rockable about said shaft against frictional restraint, an electric micro-switch movable with said support to control said delivery means, means for adjusting the operating load of said switch, a switch actuator rockable about said shaft against frictional resistance, a sensing device operable to sense oscillatory movements of a cylinder, an adjustable lost-motion device operable by said sensing device to effect operation of the switch actuator and to suppress sensed oscillatory movements of frequencies much above that due to bowing of a cylinder and of substantially constant amplitude, the operating load for said switch being of such magnitude in relation to the resistance to movement of said support that the switch is operated by oscillatory movement of said switch actuator due to sensed bowing of a cylinder but is not operated by superimposed oscillatory movements of the actuator at lower frequencies.

4. Apparatus for controlling delivery means for a heat transferring medium, comprising delivery means to deliver a heat transferring medium, a shaft restrained against angular and axial movement, a support rockable about said shaft against frictional restraint, an electric switch movable with said support to control said delivery means, operating means movable with said switch to effect operation thereof, a pair of arms straddling said switch and rockable about said shaft against frictional resistance, actuating means movable with said arms to engage and actuate said operating means, said actuating means being adjustable to permit adjustment of the operating clearance between said means and said operating means, a sensing device operable to sense oscillatory movements of a cylinder, an adjustable lost-motion device operable by said sensing device to effect operation of the switch actuator and to suppress sensed oscillatory movements of frequencies much above that due to bowing of a cylinder and of substantially constant amplitude, the operating load for said switch being of such magnitude in relation to the resistance to movement of said support that the switch is operated by oscillatory movement of said switch actuator due to sensed bowing of a cylinder but is not operated by superimposed oscillatory movements of the actuator at lower frequencies.

5. Apparatus for controlling delivery means for a heat transferring medium, comprising delivery means to deliver a heat transferring medium, a shaft restrained against angular and axial movement, a support rockable about said shaft against frictional restraint, an electric micro-switch movable with said support to control said delivery means, means for adjusting the operating load of said switch, operating means movable with said switch to effect operation thereof, a pair of arms straddling said switch and rockable about said shaft against frictional resistance, actuating means movable with said arms to engage and actuate said operating means, said actuating means being adjustable to permit adjustment of the operating clearance between said means and said operating means, a sensing device operable to sense oscillatory movements of a cylinder, an adjustable lost-motion device operable by said sensing device to effect operation of the switch actuator and to suppress sensed oscillatory movements of frequencies much above that due to bowing of a cylinder and of substantially constant amplitude, the operating load for said switch being of such magnitude in relation to the resistance to movement of said support that the switch is operated by oscillatory movement of said switch actuator due to sensed bowing of a cylinder but is not operated by superimposed oscillatory movements of the actuator at lower frequencies.

References Cited in the file of this patent

UNITED STATES PATENTS

| Number | Name | Date |
|---|---|---|
| 1,954,027 | Smith | Apr. 10, 1934 |
| 1,982,571 | Clark | Nov. 27, 1934 |